(12) United States Patent
Harrill (10) Patent No.: US 7,331,211 B2
(45) Date of Patent: Feb. 19, 2008

(54) APPARATUS FOR MEASURING SUSPENSION PARAMETERS WHICH INCLUDE ROLL CENTER

(76) Inventor: Mitchell Craig Harrill, 140 Jenkins Rd., Rossville, GA (US) 30741

( * ) Notice: Subject to any disclaimer, the term of this patent is extended or adjusted under 35 U.S.C. 154(b) by 0 days.

(21) Appl. No.: 11/348,965

(22) Filed: Feb. 7, 2006

(65) Prior Publication Data

US 2006/0174501 A1 Aug. 10, 2006

Related U.S. Application Data

(60) Provisional application No. 60/651,691, filed on Feb. 10, 2005.

(51) Int. Cl.
*G01B 5/00* (2006.01)

(52) U.S. Cl. .................. 73/11.04; 73/118.1; 33/288

(58) Field of Classification Search ........... 73/11.04, 73/11.07, 118.1; 33/264, 286, 288, 335, 33/336, 337, 193, 203, 203.18
See application file for complete search history.

(56) References Cited

U.S. PATENT DOCUMENTS

| | | | | |
|---|---|---|---|---|
| 4,768,374 A | * | 9/1988 | Fouchey | 73/118.1 |
| 5,452,606 A | * | 9/1995 | Castelnuovo | 73/118.1 |
| 2004/0003655 A1 | * | 1/2004 | Kemp et al. | 73/118.1 |

* cited by examiner

*Primary Examiner*—Eric S. McCall (57) ABSTRACT

The present invention is a method with a 3-dimensional measuring apparatus for determining vehicle suspension parameters, which include roll center, scrub radius, etc. The apparatus measures the upper and lower control arm pivot locations, which include coordinate planes X, Y, and Z, where X is longitudinal distance from front axle centerline, Y is height above ground, and Z is distance from vehicle centerline. Suspension measurements are provided by at least one lower support (23a), at least one vertical member (24a), at least one horizontal arm (26a), and at least one indicator support (22) located at a ground plane in proximity to a tire's tread. Indicator (BC') on indicator support (22) indicates at least one lower steering pivot location determined by horizontal arm (26a). Wheel pivot locator (21) connected to indicator support (22) locates kingpin trail (C") and provides a way for measuring the scrub radius between kingpin trail (C") and tire centerline (E).

18 Claims, 6 Drawing Sheets

Fig. 1
Front View

*Fig. 2*

Fig. 3
Calibration

APPARATUS FOR MEASURING SUSPENSION PARAMETERS WHICH INCLUDE ROLL CENTER

CROSS-REFERENCE TO RELATED APPLICATION

This application claims the benefit of U.S. Provisional Patent Application Ser. No. 60/651691, filed Feb. 10, 2005.

FEDERALLY SPONSORED RESEARCH

Not Applicable

SEQUENCE LISTING OR PROGRAM

Not Applicable

BACKGROUND OF THE INVENTION

1. Field of the Invention

The present disclosure relates generally to determining parameters of a vehicle's wheel, steering, and suspension, more specifically, for determining suspension parameters of a racing vehicle, which include instantaneous center, roll center, roll center height, etc.

2. Description of Prior Art

There are many devices for determining parameters of a vehicle's steering and wheel. The current trend is computer projecting imagery with printout capabilities. These systems offer parameters such as caster, camber, toe, steering axis angle, included angle, setback, turning radius, scrub radius, rolling radius, and caster trail. All of these parameters can be determined by attaching devices to the outer portion of the wheel. Cameras then detect wheel orientations from the position of each device and a computer analyzes and calculates each parameter. However, these systems do not determine parameters of a vehicle's suspension such as instantaneous center, roll center, roll center height, swing arm length, and control arm length. These parameters are extremely necessary when setting up or analyzing a vehicle's suspension layout design and determining suspension linkage ratios.

Every vehicle has front and rear roll centers. Each roll center is independent from the other and are determined by suspension geometry. Roll center is the imaginary point about which the chassis tends to roll during cornering maneuvers.

The front roll center location is extremely important to the handling performance of a vehicle. The position of the roll center will determine how the suspension will react to dynamic forces, which causes the vehicle to roll during cornering. Roll center is determined at static ride height and can be changed according to the suspension's pivot locations. For example, if the left and right suspension pivot points are positioned at symmetrical locations, the roll center will be located at the center of the vehicle. The height of roll center (the vertical distance above, below, or at the ground plane) can be changed by changing the angle of the suspension's upper or lower control arm. The position of roll center can be moved to either side of the vehicle's centerline if the suspension pivot coordinates are unsymmetrical. Roll center affects the camber change characteristics of the wheel, which is critical to the vehicle's dynamic behavior characteristics.

The current measuring technique of professional race teams is to place the vehicle on a thick machined steel surface plate. This insures that the vehicle is sitting on a perfectly level surface. The suspension pivot coordinates are measured at static ride height, by hand, using a measuring tape, level, plumb bob, strings, chalk lines, or trammel.

A plumb bob is used for determining each suspension pivot location at the ground plane and a mark is placed on the surface plate representing each point. The tire's centerline and vehicle's centerline is established and also marked. Each pivot location is measured vertically from the ground plane and laterally from the vehicle's centerline. Once these coordinates are determined, they are entered into a computer program for analysis and calculations.

Getting the true height of the upper steering and frame pivot points are difficult. There are suspension components which block vertical measurements. The lower control arm blocks the upper control arm pivot points and the tire and wheel block steering pivot points that are positioned inside the wheel rim.

It is essential to measure the vehicle at static ride height, full weight on the vehicle, and the vehicle sitting on a level ground plane. But, because of the tire and wheel, which block pivot locations positioned inside the wheel rim, it is necessary for the vehicle to be raise, set on jack stands, and the wheels removed in order to access pivot locations. However, when the vehicle is raised, the control arms move downward and the vehicle is no longer at static ride height. To prevent control arm movement, the vehicle's shocks are first removed and replaced with straight rods in order to maintain static ride height. The vehicle is then raised and the wheels are removed for accessing steering pivot locations.

In order to measure the upper pivot locations which are blocked by the lower control arm, someone must improvise, such as using a small level to extend the upper pivot point out beyond the lower control arm. A height measurement from the level to the ground plane is taken. It is also necessary to improvise when determining lateral distances between upper pivot locations and the vehicle's centerline.

CONCLUSION—PRIOR ART

After observing prior suspension measuring techniques, it becomes apparent that there is a need to have an apparatus that will measure steering pivot coordinates, which are placed inside the wheel rim, and are considered to be inaccessible with the tire and wheel on the vehicle. There is a further need for an apparatus that will achieve a more precise measurement of the suspension's upper pivot locations without improvising to obtain measurements. A further need is for an apparatus that will measure a vehicle's upper and lower suspension pivot coordinates simultaneously and 3-dimensionally for quicker analysis of parameters which include instantaneous center, roll center, roll center height, etc.

THE INVENTION—OBJECT AND ADVANTAGES

Accordingly, several objects and advantages of the present invention are:

1. to determine steering pivot locations, which are considered to be inaccessible with the tire and wheel mounted to the vehicle;

2. to measure the upper and lower suspension pivot coordinates simultaneously for quicker analysis of suspension parameters;

3. to determine vehicle suspension parameters by measuring 3-dimensional coordinate planes X, Y, and Z, which are:
  longitudinal distance from front axle centerline (X direction);
  height above ground (Y direction);
  distance from vehicle centerline (Z direction);
4. to provide an apparatus that will measure coordinate planes X, Y, and Z of a suspension's:
  (a) upper frame pivot location;
  (b) upper steering pivot location;
  (c) lower frame pivot location;
  (d) lower steering pivot location;
  (e) steering tie-rod pivot location;
  (f) spring pad locations;
5. to provide an apparatus for analysis of parameters of a vehicle's wheel, steering, and suspension, which determine camber change characteristics of the tire and wheel;
6. to determine the static weight on the tire during setup and analysis of suspension parameters;
7. to provide wheel, steering, and suspension coordinates for determining parameters which include:
  (1) instantaneous center;
  (2) roll center;
  (3) roll center height;
  (4) swing arm length;
  (5) upper control arm length;
  (6) lower control arm length;
  (7) upper control arm angle;
  (8) lower control arm angle;
  (9) spring length;
  (10) spring angle;
  (11) upper spring pad location;
  (12) lower spring pad location;
  (13) linkage and motion ratios of front springs at the wheel;
  (14) vehicle centerline;
  (15) upper steering vertical trail;
  (16) lower steering vertical trail;
  (17) kingpin angle;
  (18) kingpin trail (wheel's pivot point at the ground plane);
  (19) caster angle;
  (20) caster trail;
  (21) hub location;
  (22) axle centerline;
  (23) tire centerline;
  (24) scrub radius;
  (25) rolling radius;
  (26) turning radius;
  (27) camber angle;
  (28) included angle;
  (29) toe angle;
  (30) suspension setback;
  (31) front track;
  (32) hub distance;
  (33) ride height;
  (34) spindle distance between the upper and lower steering pivot;
  (35) static weight on the tire;
  (36) anti-dive and pro-dive geometry;
  (37) tie-rod pivot locations.

Further objects and advantages will become apparent from a consideration of the ensuing description and drawings.

BRIEF SUMMARY OF THE INVENTION

The present disclosure provides a method with a 3-dimensional measuring apparatus, assisted with an electronic calculator for determining wheel, steering, and suspension parameters of a racing vehicle. Parameters are determined by electronically measuring simultaneously 3-dimensional coordinates planes X, Y, and Z of the suspension's upper frame or upper steering pivot location, coupled with the 3-dimensional coordinates planes X, Y, and Z of the suspension's lower frame or lower steering pivot location.

These coordinates determine the control arm's length and angle, which are use in determining parameters such as instantaneous center, roll center, roll center height, etc. Other parameters include the steering coordinate axes (SCA), which comprises parameters that are positioned inside and beneath the tire and wheel area. These parameters are previously considered inaccessible with the tire and wheel on the vehicle. However, the present invention measures the SCA with the tire and wheel on the vehicle. Other coordinates provided by the apparatus include the tie-rod pivot locations, tire contact patch, and vehicle centerline.

A computer using a 3-dimensional geometry program is coupled with the apparatus for generating an image of the tire, wheel, and steering knuckle, which is determined from the measurements taken by the apparatus. A cross-section of the image is illustrated on a display screen attached to the apparatus and a choice of top, front, or side views are disclosed. The onscreen image combined with measuring scales at the top, side, and lower section of the apparatus allows a precise 3-dimensional parameter analysis of the steering and suspension.

Another feature of the apparatus includes a turn-and-weigh scale for determining the static weight on the tire to which the apparatus is applied. This feature helps determine lateral weight transfer, weight on the tire during cornering, and the tire's available traction. The apparatus also adjusts for adapting to suspension designs such as the double A-arm, McPherson type strut, etc.

BRIEF DESCRIPTION OF DRAWINGS

FIGS. 1, 4, 5, and 6 show the present invention illustrating a height measurement of at least one vehicle suspension or steering pivot measured from a ground plane or surface in combination with at least one selected from the group of one suspension angle, one suspension line, one suspension plain, one suspension vector, one line segment, or one distance between suspension pivot points, for determining and measuring at least one suspension parameter.

| DRAWING - Reference Numerals | |
|---|---|
| 01 | lateral indicator mark |
| 02 | axle center longitudinal mark |
| 03 | indication mark |
| 04 | locator |
| 20 | lower member |
| 21 | wheel pivot locator |
| 22 | indicator support |
| 23 | outer lower member |
| 23a | inner lower member |
| 24 | outer vertical member |
| 24a | inner vertical member |
| 25 | outer extension |
| 25a | inner extension |
| 26 | upper horizontal arm |
| 26a | lower horizontal arm |
| 27 | pivot guide |
| 28 | pivot locator |
| 29 | level |
| 30 | electronic calculator |
| 31 | lower base |
| 32 | brake |
| 33 | vertical member |
| 34 | laser protractor |
| 35 | measuring tape |
| 36 | lower cross member |
| 37 | turn-and-weigh scale |

| DRAWING - Reference Letters | |
|---|---|
| A | upper steering pivot |
| B | lower steering pivot |
| C | upper steering pivot vertical trail |
| C' | lower steering pivot vertical trail |
| C" | kingpin trail |
| D | upper tire centerline |
| E | lower tire centerline |
| F | outer face of hub |
| G | hub's vertical location at ground |
| H | upper frame pivot |
| I | lower frame pivot |
| J | vehicle centerline |
| K | kingpin angle |
| L | axle centerline |
| AC | indicator for line A to C |
| BC' | indicator for line B to C' |
| AC" | indicator for line A to C" |
| DE | indicator for line D to E |
| FG | indicator for line F to G |

DETAILED DESCRIPTION OF THE PREFERRED EMBODIMENTS

Alignment of the Apparatus to the Vehicle

The apparatus must be calibrated (seen in FIG. 3) and aligned to the vehicle before analysis of suspension parameters can be determined. There are several methods that I use for aligning the apparatus. The first method is placing the apparatus around the tire (seen in FIG. 1) and adjusting the toe alignment of the front tire to zero, then position the zero on front and rear lower members 20 using indicators DE to align to the tire's fore and aft lower centerline. Another method (not shown) is using a cross-bar with laser projection. The cross-bar is place at the ground plane behind and transversely up against the left and right rear tires. The laser is projected to the apparatus and the apparatus is then squared to the laser. Still another method (not shown) is to align the apparatus to the vehicle's centerline, also using laser projection to square the apparatus.

Measuring Lateral, Vertical, and Longitudinal Measurements.

Figure 1:
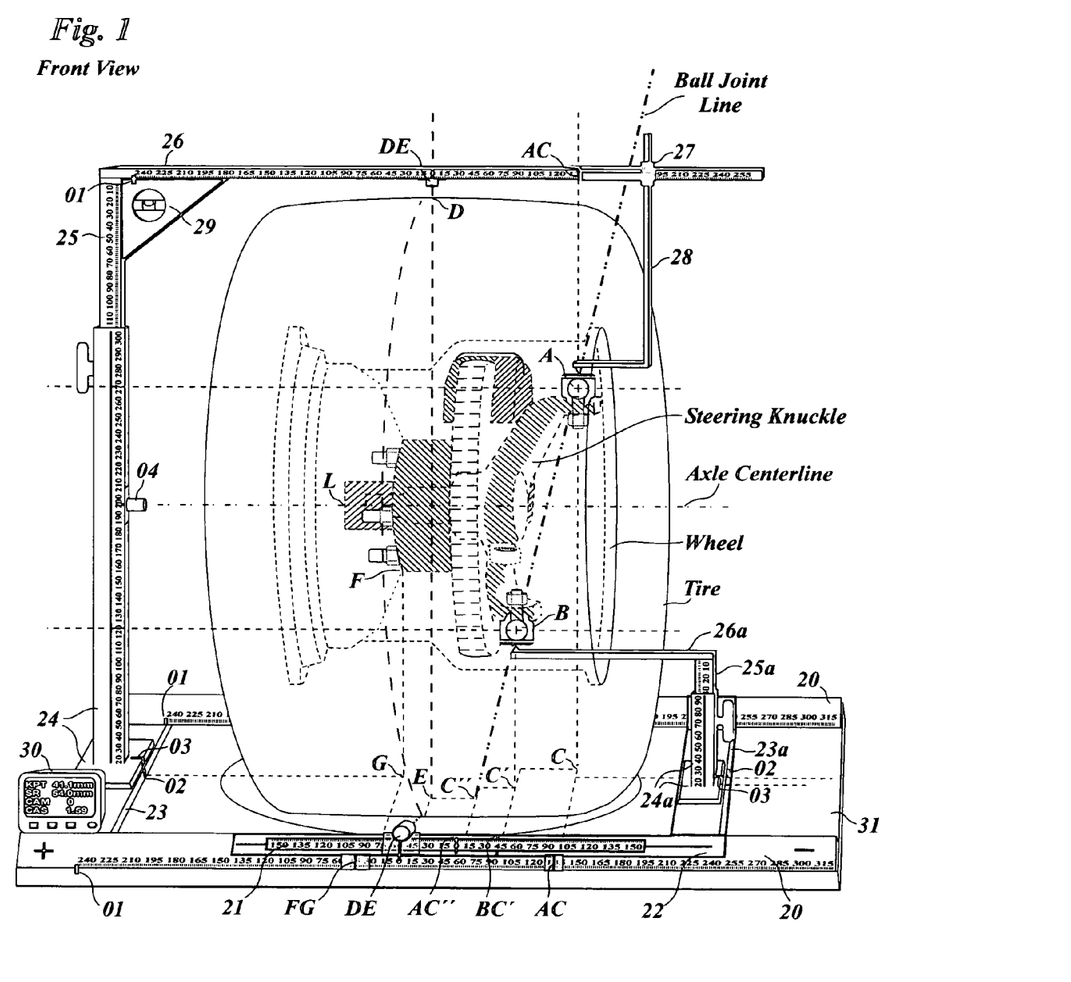
FIG. 1 shows a perspective view of the apparatus determining a ball joint line formed between steering pivot A, steering pivot B, and intersecting the ground plane at kingpin trail C".

FIG. 1 shows a perspective view of the apparatus assembled and in an operable position. The ball joint line is determined through upper steering pivot A and lower steering pivot B, and intersects the ground plane at kingpin trail C".

The location of upper steering pivot A is determined by pivot locator 28, which is used for locating steering pivot A when positioned inside a wheel rim. The height from the ground plane of steering pivot A is determined by outer vertical member 24 or outer extension 25 and is relative to the length of pivot locator 28.

The lateral position of steering pivot A is determined by an upper horizontal arm 26. Horizontal arm 26 supports upper guide 27. Upper guide 27 includes indicator AC for indicating the lateral position of upper steering pivot A, which is relative to the vehicle's centerline and tire centerline.

A second indicator AC is located on lower member 20 and is positioned to the exact location as upper indicator AC. This position indicates upper steering pivot vertical trail C. Vertical trail C represents an intersecting point at the ground plane directly below upper steering pivot A. Indicator DE, located on the upper horizontal arm 26, is used for locating the tire's upper centerline D, and indicator DE, located on lower member 20, indicates lower tire centerline E.

The longitudinal distance of steering pivot A from axle centerline L is determined by aligning axle centerline longitudinal mark 02 (seen on lower member 23) with indicator mark 03 (seen on outer vertical member 24). The apparatus is then adjusted forward or rearward in order to position locator 04 (seen on outer vertical member 24) to axle centerline L. The outer vertical member 24 is then slid forward or rearward in order to position upper horizontal arm 26 and pivot locator 28 to the center of upper steering pivot A. The longitudinal distance is indicated by the distance between axle centerline longitudinal mark 02 and indicator mark 03.

The location of lower steering pivot B is determined by lower horizontal arm 26a. Indicator BC' (seen on indicator support 22) is fixed to the exact position as the end tip of horizontal arm 26a. Indicator BC' indicates the intersecting point at the ground plane of lower steering pivot vertical trail C'.

The height from the ground plane of steering pivot B is determined by inner vertical member 24a or inner extension 25a. The longitudinal distance of steering pivot B from axle centerline L is determined by axle center longitudinal mark 02 (seen on inner lower member 23a) and indication mark 03 (seen on inner vertical member 24a). Inner vertical member 24a is slid forward or rearward in order to position lower horizontal arm 26a to the center of lower steering pivot B. The longitudinal distance is indicated by the distance between axle centerline longitudinal mark 02 and indicator mark 03.

Measuring Positive, Zero, and Negative Scrub Radius

The wheel's pivot point at the ground plane is kingpin trail C" and is indicated by indicator AC", which is centrally located on wheel pivot locator 21. Wheel pivot locator 21, indicator AC", and indicator DE are positioned fore or aft of the tire's lower tread area and are used for measuring a positive, zero, or negative scrub radius.

Indicator DE, located on wheel pivot locator 21, is positioned to lower tire centerline E. Indicator AC", when positioned to the inner side of indicator DE (between the tire's centerline and vehicle's centerline), represents a positive scrub radius. Indicator AC", when positioned even with indicator DE, represents a zero scrub radius. Indicator AC", when positioned to the outer side of indicator DE (between the tire's centerline and outer face of the wheel), represents a negative scrub radius.

Method for Measuring Kingpin Trail and Scrub Radius

There are several methods that I use for determining parameters which include kingpin trail and scrub radius. One method is using the height of at least one steering pivot, measured by either the outer vertical extension 25 or inner vertical extension 25a, coupled in a calculation with the angle of the ball joint line to determine kingpin trail C". Indicator DE on wheel pivot locator 21 is adjusted to point to tire centerline E at the ground plane. Kingpin trail C" is represented by indicator AC". The distance between DE and AC" is the scrub radius. Another method uses the location of steering pivot A and B and the height from the ground plane of steering pivot B for determining kingpin trail C". Still another method uses the height of at least one steering pivot coupled with a ball joint line for determining the location at the ground plane of kingpin trail C". The scrub radius distance is measured at the ground plane between kingpin trail C" and the tire's centerline.

A further method uses a computer-aided alignment device coupled with an optical scanner and/or laser placed in front of the vehicle (not shown). The present apparatus is used to locate steering pivot A or B. The optical scanner and/or laser locates the center of the tire and wheel. The pivot coordinates of steering pivot A or B are provided by the present apparatus and are sent to the computer-aided alignment device, which uses the information from the apparatus, optical device, and/or laser to calculate and determine the kingpin trail C" and scrub radius.

Measuring Hub Distance

Locator 04 (seen on vertical member 24) can be vertically adjusted to locate any point on the outer surface of the wheel or hub. The locator 04 determines the distance to the outer face of hub F and indicator FG marks the location of the lower member 20.

Suspension Calculator

An electronic calculator 30, such as a computer using a suspension geometry program, is attached to the front outer side of the apparatus for calculating suspension parameters and displaying graphic suspension geometry created by measurements taken by the apparatus.

FIG. 1 Summary

1. Upper steering pivot A and ground plane of vertical trail C is located by indicator AC (seen on lower member 20).

2. Lower steering pivot B and ground plane of vertical trail C' is located by indicator BC' (seen on indicator support 22).

3. The lateral position, height, and longitudinal distance of steering pivots A and B are measured from the ground plane, vehicle centerline, and axle centerline L.

4. The ball joint line between steering pivot A and steering pivot B intersects the ground plane at kingpin trail C", which is indicated by indicator AC" (seen centrally located on wheel pivot locator 21).

5. Indicator DE (seen on wheel pivot locator 21) is adjusted to point to tire centerline E at the ground plane. A measurement between indicator DE and indicator AC" determines scrub radius.

6. Positive, zero, and negative scrub radius is measured on wheel pivot indicator 21, using indicator DE and indicator AC".

7. All methods of determining kingpin trail and scrub radius use the height of at least one steering pivot point.

8. Hub distance is measured by locator 04 (seen on outer vertical member 24) and is marked by indicator FG (seen on member 20).

Main Embodiments

Figure 2:
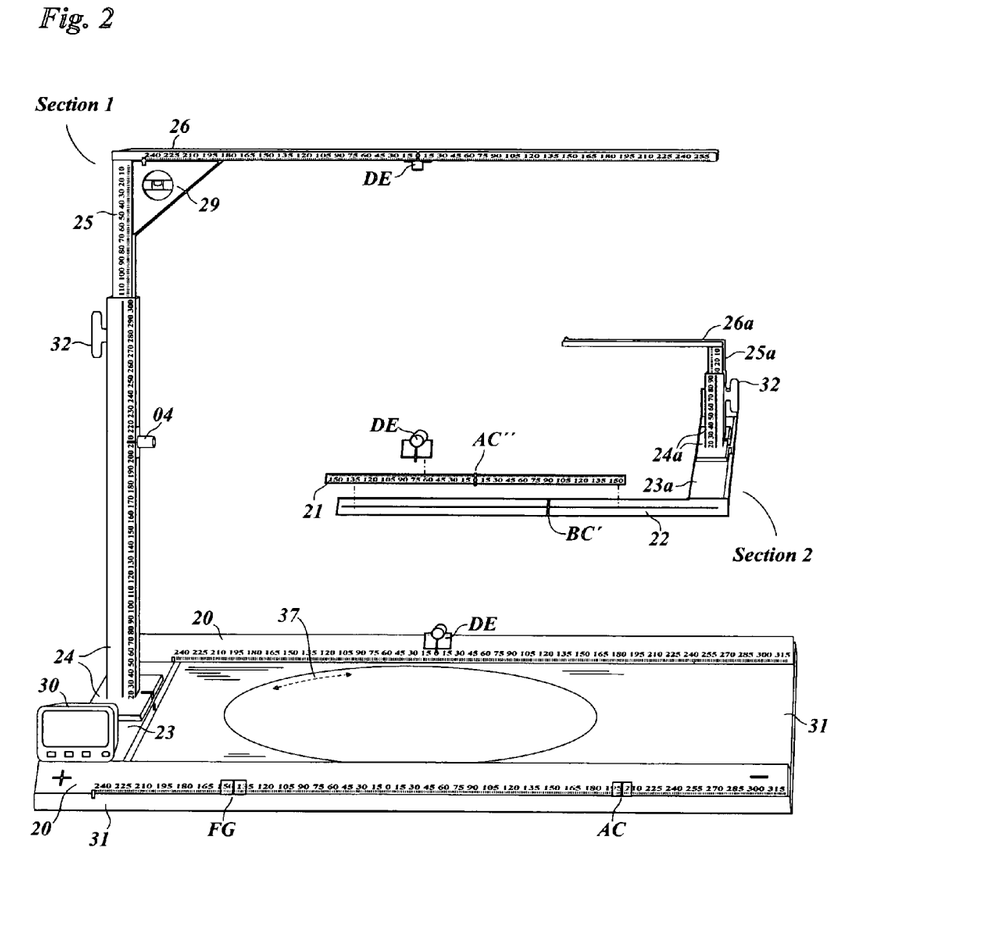
FIG. 2 shows the two main embodiments of the apparatus.

FIG. 2 shows the two main embodiments of the apparatus for measuring suspension pivot locations, which are:

Section 1. A base and outer section for measuring upper pivot locations;

Section 2. An inner lower section for measuring lower pivot locations.

Section 1 consist of interconnected members which include lower base 31, turn-and-weigh scale 37, a laterally adjustable front and rear lower member 20, indicator DE connected to the rear lower member 20, outer lower member 23, a longitudinally adjustable outer vertical member 24, a vertically adjustable locator 04 connected to member 24 for locating the axle's centerline and outer face of hub F, a vertically adjustable outer extension 25, brake 32 for securing member 25, and a laterally adjustable upper horizontal arm 26. Upper horizontal arm 26 supports a laterally adjustable indicator DE for locating lower tire rear centerline D, upper steering pivot A, or upper frame pivot H (shown in FIG. 4).

Section 2 consists of interconnected members which include a laterally adjustable inner lower member 23a, a longitudinally adjustable inner vertical member 24a, a vertically adjustable inner extension 25a, brake 32 for securing member 251, and lower horizontal arm 26a. Indicator support 22 is permanently attached to inner lower member 23a. The indicator BC' is used for indicating lower steering pivot B. Indicator AC" is permanently positioned at the zero mark on wheel pivot locator 21. Indicator support 22 is the support for wheel pivot locator 21 and indicator DE.

Figure 3:
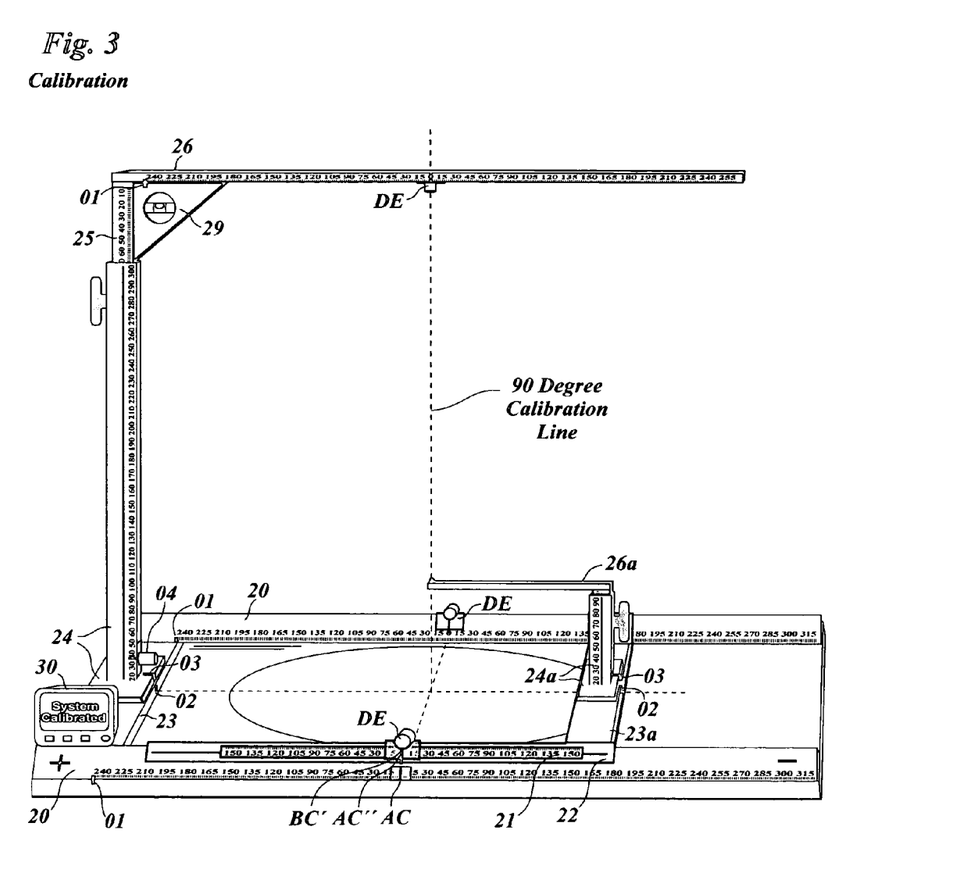
FIG. 3 shows the apparatus calibrated.

System Calibration—FIG. 3

FIG. 3 shows the apparatus calibrated and in an operable position. To calibrate the system, upper horizontal arm 26 and front and rear lower member 20 are aligned equally with upper and lower lateral indicator mark 01.

Indicator DE located on upper horizontal arm 26 is positioned to zero. Wheel pivot locator 21 and lower indicators DE, AC, BC', and AC" are positioned to zero on the lower member 20.

Axle center longitudinal mark 02, seen on outer lower member 23, is aligned with indication mark 03, seen on outer vertical member 24.

Axle center longitudinal mark 02, seen on inner lower member 23a, is aligned with indication mark 03, seen on inner vertical member 24a.

Outer extension 25 is lowered and locator 04 is positioned to the bottom of vertical member 24. The electronic calculator 30 for calculating and displaying is reset and the inner lower section is slid off lower members 20.

Operation

Once the apparatus is calibrated (see FIG. 3), base 31 is placed under the tire (see FIG. 1). The outer vertical member 24 is positioned to the outer side of the wheel with the upper horizontal arm 26 placed over the top of the tire. The inner lower section is slid back on lower members 20 with the tip of lower horizontal arm 26a pointing toward outer vertical member 24. Upper pivot coordinates are obtained by moving outer vertical member 24 forward or rearward and upper guide 27 laterally on horizontal arm 26. Lower pivot coordinates are obtained by moving inner lower member 23a laterally on lower member 20 and inner vertical member 24a forward or rearward.

Measuring Roll Center

Figure 4:
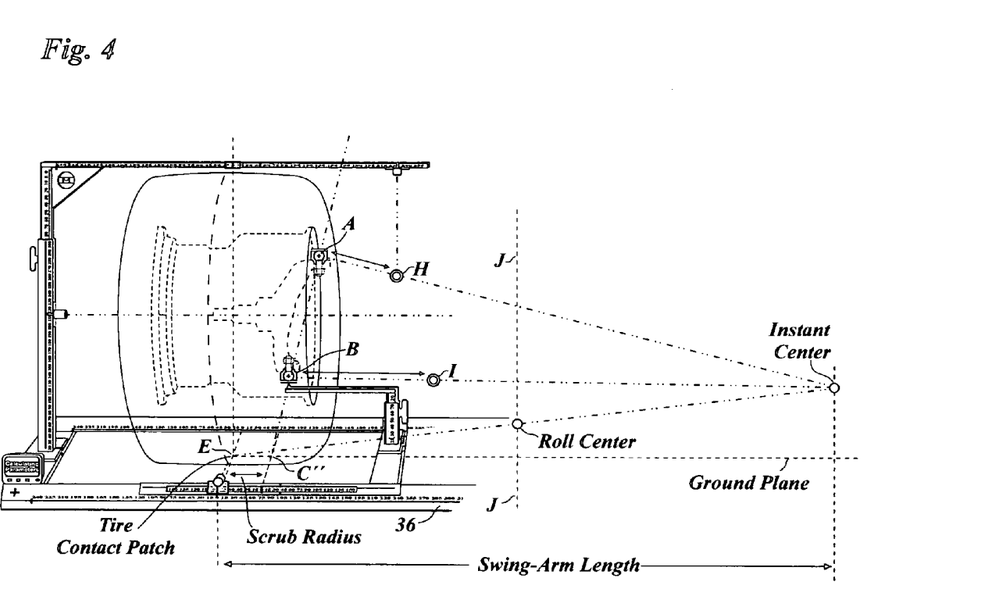
FIG. 4 is an illustration of the apparatus determining instantaneous center (instant center), roll center, roll center height, steering scrub radius (scrub radius), and swing-arm length.

FIG. 4 shows the measuring apparatus assisted with an electronic calculator 30 for determining at least one of an instant center, roll center, and height of roll center relative to the ground plane. The upper control arm angle is determined by measuring relative to the ground plane the coordinates of the upper steering pivot A and upper frame pivot H. The lower control arm angle is determined by measuring relative to the ground plane the coordinates of the lower steering pivot B and lower frame pivot I. An intersection between the upper and the lower control arm angle determines an instant center. The roll center location is determined on a line from instant center to the center of a tire's contact patch. The height of roll center is determined by the vertical distance above, below, or at the ground plane.

FIG. 4 also shows the relation between kingpin trail C", tire centerline E, scrub radius, swing-arm length and vehicle centerline J. Swing-arm length is the distance between the tire's contact patch and instant center. An additional lower cross bar 36 is used for connecting two apparatuses for simultaneously measuring left and right suspension parameters. Parameters are electronically calculated using the measurements provided by the apparatus and the results are illustrated on electronic calculator 30 attached to the apparatus.

Figure 5:
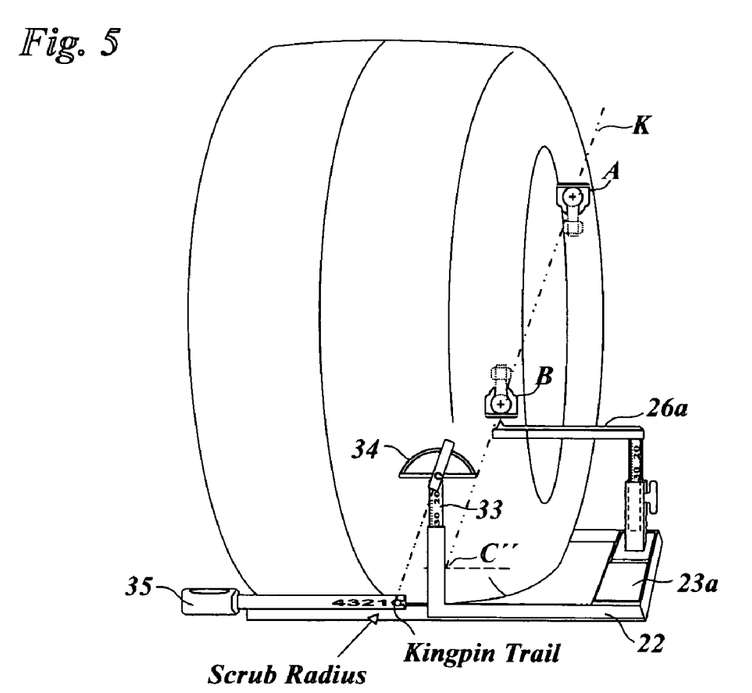
FIG. 5 shows the apparatus measuring kingpin trail and scrub radius without using calculations or electronics.

FIG. 5 shows the lower inner section of the apparatus measuring kingpin trail and scrub radius without any calculations or electronics. The apparatus is positioned to the lower inside area of the tire. The indicator support 22 is positioned in front of the tire's lower tread area and supports an adjustable vertical member 33. Vertical member 33 connects an adjustable laser protractor 34. The height of at least one steering pivot is measured and duplicated by vertical member 33. The laser protractor 34 is adjusted to a known kingpin angle K and projected to the tire's centerline at the ground plane. A measuring tape 35 is held against the lower tire area and a measurement is taken from the laser's projected point to the tire's centerline. This measurement determines scrub radius.

Figure 6:
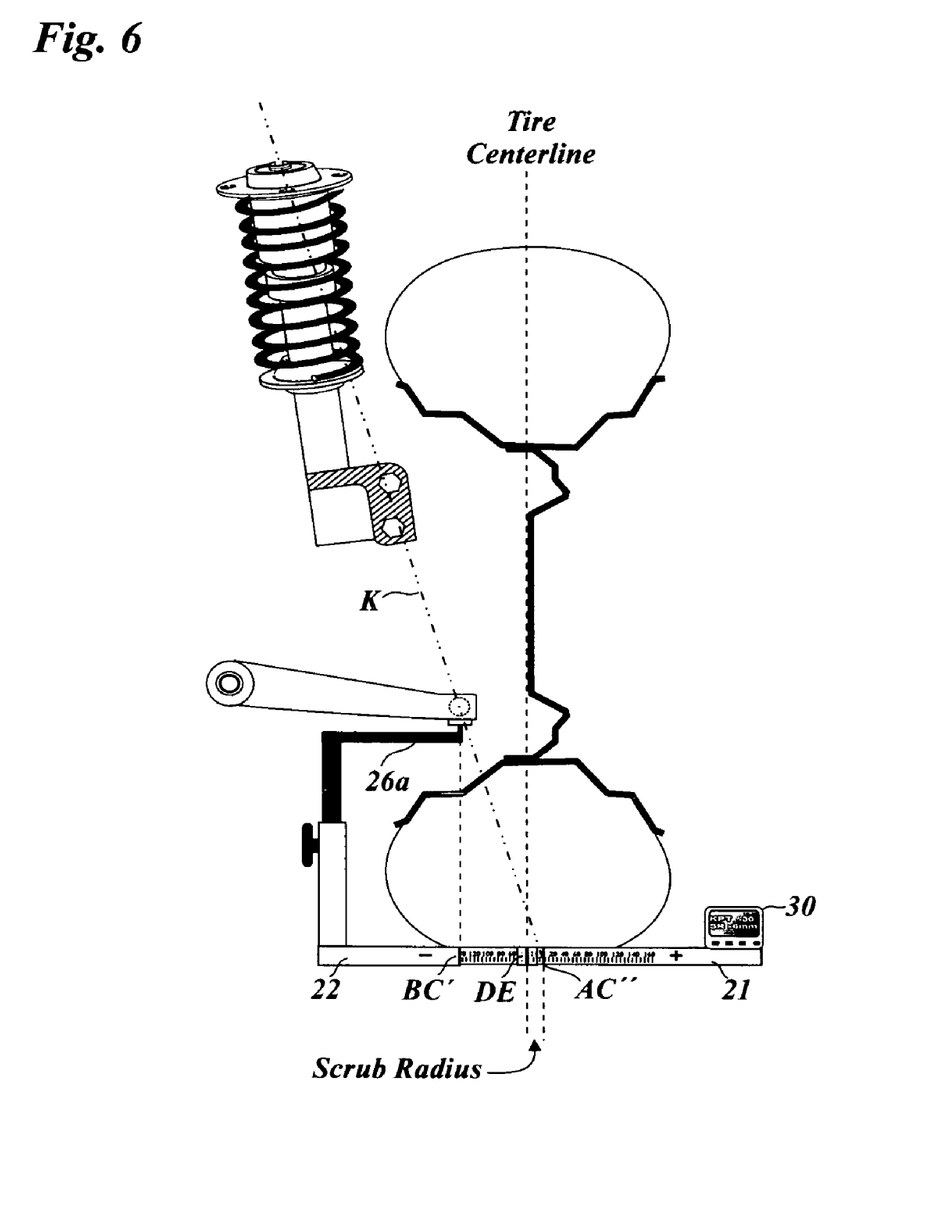
FIG. 6 shows the apparatus measuring the lower steering pivot, coupled with an electronic calculator to determine kingpin trail C".

FIG. 6 shows the apparatus using an electronic calculator 30 for determining suspension parameters which include kingpin trail and scrub radius. The apparatus incorporates means for electronically determining vertical, lateral, longitudinal, and angular measurements. Horizontal arm 26a locates the lower steering pivot point. A known kingpin angle K is enter into electronic calculator 30 and is coupled with the height of the steering pivot, which is determined by the apparatus. Electronic calculator 30 calculates kingpin trail C" and determines the distance to which the indicator AC" needs to be moved away from indicator BC. Indicator DE is then positioned to the center of the tire and electronic calculator 30 displays the kingpin trail and scrub radius results.

Advantages

From the previous description, the following advantages become evident when using the apparatus for determining suspension parameters:

(1) measuring 3-dimensional locations of the upper and lower suspension pivot points;

(2) measuring steering pivot locations that are positioned inside a wheel rim;

(3) determining measurements of the upper suspension pivot points which are blocked by lower suspension components;

(4) using the present apparatus to setup and analyze parameters of a vehicle's wheel, steering, and suspension, which determine camber change characteristics of the wheel.

Ramifications and Scope

Accordingly, the reader will see that the present invention can be made and designed in different ways in order to achieve the same results. Although the description above contains many specificities, these should not be construed as limiting the scope of the present invention, but as merely providing illustrations of some of the presently preferred embodiments of my apparatus. For example, the structure of the present invention may have other shapes such as circular, oval, triangular, etc. The parts may be made of any material such as aluminum, metal, plastic, fiberglass, etc. Also various sizes may be used for any of the parts such as indicators, horizontal arms, vertical members, etc.

The locators and indicators may be any means to point, indicate, or link the position of a wheel, steering, or suspension with measurements, which can determine the distance from the vehicle's centerline, height from the ground plane, or longitudinal distance relative to the axle centerline. The locators and indicators can be chosen from the group of mechanical, electrical, optical, laser, ultra sonic, magnetic, pressure sensors, or their equivalent.

The means for vertical, lateral, and longitudinal measuring may be chosen from the group consisting of mechanical scales, electrical scales, optical scales, digital readouts, encoders, lasers, or any of their combination, or their equivalent for performing the same measuring functions as previously described.

An electronic calculator such as a computer, which stores, calculates, and displays suspension parameter data gathered by the present apparatus, can be used for determining parameters such as instant center, roll center, roll center height, etc. The electronic calculator can be attached directly to the apparatus for displaying graphic illustrations of suspension geometry as previously described. The calculator may also be linked wireless to a detached computer. Information may be sent from the calculator to the computer for displaying parameter results.

The apparatus may be used manually without electronics. Measurements provided by the apparatus may be entered manually into a calculator or into a roll center calculator for determining suspension parameters. Several versions of roll center calculator are available and can be purchased from Wm. C. Mitchell Software or Performance Trends, Inc.

CONCLUSION

While I have described successful structures for constructing my measuring apparatus, it is possible in the art to make various modifications and still achieve the results desired without departure from the invention. Thus the scope of my apparatus for measuring suspension parameters, which include roll center, should be determined by the appended claims and their legal equivalents, rather than by the examples given.

I claim:

1. A method of determining the association between a vehicle's lower steering pivot joint and a contact patch of a tire without removing said tire from said vehicle, comprising:
providing means for locating said lower steering pivot joint and determining a vertical and lateral position of said lower steering pivot joint relative to said contact patch without removing said tire from said vehicle.

2. A method according to claim 1, wherein said association between said lower steering pivot joint and said contact patch is used in determining at least one parameter chosen from the group of kingpin trail, scrub radius, or caster trail.

3. A method according to claim 1, wherein said means includes an articulated gauge having an arm for locating said lower steering pivot joint.

4. A method according to claim 3, wherein said arm is connected to an adjustable vertical support placed under a vehicle's lower control arm, said vertical support is used for determining a vertical distance between said lower steering pivot joint and a ground plane.

5. A method according to claim 4, wherein said vertical support is connected to a first horizontal member placed under said lower control arm on said ground plane and said first horizontal member connects perpendicular to a second horizontal member which is placed on said ground plane transversely fore or aft of said tire.

6. A method according to claim 5, wherein said second horizontal member includes at least one indicator chosen from the group of fixed or slidable marker, measuring scale, or laser, for identifying at least one position chosen from the group of a lateral position of said lower steering pivot joint relative to said contact patch, a tire and wheel's pivot point at said contact patch, or the tire's centerline at said contact patch.

7. A method according to claim 6, wherein said indicator identifies at least one intersection between said contact patch and at least one line established through said lower steering pivot joint, and said indicator determines said intersection while said tire associated with said lower steering pivot joint remains on said vehicle.

8. A method of determining the association between a vehicle's upper steering pivot joint and a contact patch of a tire without removing said tire from said vehicle, comprising:
providing means for locating said upper steering pivot joint and determining a vertical and lateral position of said upper steering pivot joint relative to said contact patch without removing said tire from said vehicle.

9. A method according to claim 8, wherein said association between said upper steering pivot joint and a tire's contact patch is used in determining at least one parameter chosen from the group of kingpin frail, scrub radius, or caster trail.

10. A method according to claim 8, wherein said means includes an articulated gauge having an arm for locating said upper steering pivot joint.

11. A method according to claim 10, wherein said arm is connected to an adjustable vertical support placed to the outer side of said tire, said vertical support is used for determining a vertical distance between said upper steering pivot joint and a ground plane.

12. A method according to claim 11, wherein said vertical support is connected to a first horizontal member placed to the outer side of said tire on said ground plane and said first horizontal member connects perpendicular to a second horizontal member which is placed on said ground plane transversely fore or aft of said tire.

13. A method according to claim 12, wherein said second horizontal member includes at least one indicator chosen from the group of fixed or slidable marker, measuring scale, or laser, for identifying at least one position chosen from the group of a lateral position of said upper steering pivot joint relative to said contact patch, a tire and wheel's pivot point at said contact patch, or the tire's centerline at said contact patch.

14. A method according to claim 13, wherein said indicator identifies at least one intersection between said contact patch and at least one line established through said upper steering pivot joint, and said indicator determines said intersection while said tire associated with said upper steering pivot joint remains on said vehicle.

15. A method of determining the association between a vehicle's upper steering pivot joint and lower steering pivot joint without removing a tire associated with said upper and said lower steering pivot joint, comprising:
providing means for locating said upper steering pivot joint and determining a vertical and lateral position of said upper steering pivot joint relative to said lower steering pivot joint without removing said tire from said vehicle.

16. A method according to claim 15, wherein said means includes an articulated gauge having an outer section which includes a first horizontal arm attached to an outer vertical support, said outer vertical support is attached to an outer horizontal member longitudinally placed on a ground plane at the outer side of said tire for locating an upper steering pivot joint, and said means further includes an inner section having a second horizontal arm for locating a lower steering pivot joint, and said inner section is slidably connected to said outer section by a horizontal member placed at a ground plane transversely fore of aft of said tire.

17. A method according to claim 15, wherein said means determines at least one measurement chosen from the group of a vertical measurement between said upper steering pivot joint and a ground plane, a vertical measurement between said lower steering pivot joint and a ground plane, a vertical measurement between said upper and said lower steering pivot joint, a lateral measurement between said upper and said lower steering pivot joint, or a longitudinal measurement between said upper and said lower steering pivot joint.

18. A method according to claim 15, wherein said means further determines at least one parameter chosen from the group of a vehicle's upper control arm angle, lower control arm angle, swing arm length, upper control arm length, lower control arm length, instant center, roll center, roll center height, caster angle, caster trail, kingpin angle, kingpin trail, scrub radius, included angle, camber angle, pro dive geometry, or anti dive geometry.

* * * * *